(12) United States Patent
Sticker et al.

(10) Patent No.: US 9,791,044 B2
(45) Date of Patent: Oct. 17, 2017

(54) LOCKING APPARATUS FOR A HYDROMECHANICAL SPRING ENERGY STORE DRIVE FOR A GAS-INSULATED SWITCHGEAR ASSEMBLY

(71) Applicant: ABB TECHNOLOGY AG, Zürich (CH)

(72) Inventors: Claus Sticker, Grosskrotzenburg (DE); Thomas Klose, Eidengesäss (DE); Jörg Knospe, Bruchköbel (DE); Thomas Brenneis, Mainaschaff (DE)

(73) Assignee: ABB Schweiz AG, Baden (CH)

( * ) Notice: Subject to any disclaimer, the term of this patent is extended or adjusted under 35 U.S.C. 154(b) by 761 days.

(21) Appl. No.: 14/244,233

(22) Filed: Apr. 3, 2014

(65) Prior Publication Data

US 2014/0298983 A1    Oct. 9, 2014

(30) Foreign Application Priority Data

Apr. 4, 2013  (DE) .................. 10 2013 005 621

(51) Int. Cl.
| H01H 33/34 | (2006.01) |
| F16J 1/10  | (2006.01) |
| H01H 3/24  | (2006.01) |
| H01H 3/30  | (2006.01) |

(52) U.S. Cl.
CPC .............. *F16J 1/10* (2013.01); *H01H 3/24* (2013.01); *H01H 33/34* (2013.01); *H01H 2003/3036* (2013.01)

(58) Field of Classification Search
CPC .. H01H 2071/506; H01H 33/34; H01H 33/32; H01H 3/24; F16J 1/10
See application file for complete search history.

(56) References Cited

U.S. PATENT DOCUMENTS

| 4,716,812 A |   | 1/1988  | Koerner et al. |
| 5,142,259 A | * | 8/1992  | Kelaita, Jr. .............. H01H 3/62 335/167 |
| 6,649,853 B2 | * | 11/2003 | Takagi .................... H01H 33/34 218/7 |

FOREIGN PATENT DOCUMENTS

| CN | 201294164 Y | 8/2009  |
| CN | 202560494 U | 11/2012 |
| DE | 34 08 909 A1 | 9/1985  |
| EP | 0240884 A2 | 10/1987 |

(Continued)

*Primary Examiner* — Logan Kraft
*Assistant Examiner* — Abiy Teka
(74) *Attorney, Agent, or Firm* — Barnes & Thornburg LLP

(57) ABSTRACT

A locking apparatus for a hydromechanical spring energy store drive for actuating a medium-voltage or high-voltage circuit breaker is disclosed, the spring energy store drive includes a working piston, which is guided in an axial cutout in a pressure housing or working cylinder, and a spring energy store arrangement. The locking apparatus includes a first pressure region and a second pressure region, which are under elevated pressure when the circuit breaker is closed, and a third pressure region, which is unpressurized. The latching bolt can be arranged perpendicular to the working piston, via a latching apparatus, which can be arranged on a side of the latching bolt, which is to point towards the working piston and via the spring energy store arrangement, which is to be pushed away from the working piston.

20 Claims, 2 Drawing Sheets

(56) References Cited

FOREIGN PATENT DOCUMENTS

EP        0 829 892 A1    3/1998
EP        2492937 A1    8/2012

\* cited by examiner

LOCKING APPARATUS FOR A HYDROMECHANICAL SPRING ENERGY STORE DRIVE FOR A GAS-INSULATED SWITCHGEAR ASSEMBLY

RELATED APPLICATION(S)

This application claims priority under 35 U.S.C. §120 to German Patent Application No. 10 201 3 005 621.7 filed Apr. 4, 2013, the entire content of which is hereby incorporated by reference in its entirety.

FIELD

The disclosure relates to a locking or blocking apparatus for a hydromechanical spring energy store drive for a high-voltage or medium-voltage switch, for example, a circuit breaker. The disclosure also relates to a hydromechanical spring energy store drive for a medium-voltage or high-voltage circuit breaker, which spring energy store drive can include a locking or blocking apparatus as disclosed.

BACKGROUND INFORMATION

Hydraulic spring energy store drives for actuating high-voltage circuit breakers are known, for example, from DE 3408909 A1 and EP 0829892 A1, wherein a spring element interacts with a movable storage piston, which is guided in a hydraulic block.

Hydromechanical spring energy store drives can have a working cylinder. A piston of the working cylinder can be connected to a piston rod, which can be movable by means of pressure loading of a pressure volume. The piston rod can be connected to an electrical circuit breaker, and by virtue of the movement of the piston rod, the electrical circuit breaker can be switched. In order to open the electrical circuit breaker, a hydraulic pressure can be applied to the pressure volume in the working cylinder, such that the piston rod can be moved into a corresponding position.

The pressure in the pressure volume can be provided by a pressure cylinder, which can be coupled to a mechanical energy store unit, such as a spring arrangement, for example. If the circuit breaker is to be switched, the spring force can be released onto the pressure cylinder, such that a working or system pressure can be build up in the cylinder, which can also be present in the pressure volume of the cylinder, via a hydraulic connection. Due to the working pressure in the pressure region, the piston and the piston rod of the differential cylinder can be moved.

In order to protect hydromechanical drives of high-voltage circuit breakers from switching off in an undesired manner in the event of pressure loss at the drive, a latch in the form of a latching bolt can be used, which can fix the working piston of the drive in an "ON" position.

During the work involved the first time the system is brought into operation or during maintenance work and in the case of unpressurized slow switching operations, in which the working piston is moved without any drive pressure, the latching bolt needs to be deactivated in order to avoid damage to the hydromechanical drive.

If, during maintenance work, the working piston is to be moved without pressure, the latching bolt attempts to prevent the movement. In order that the latching bolt in this case does not engage, however, the latching bolt should be deactivated in advance since the latch in the form of a latching bolt otherwise operates counter to the movement being performed. If this is disregarded or the latching piston or latching bolt has been set incorrectly, the hydromechanical drive becomes unusable.

In accordance with an exemplary embodiment, the disclosure provides a locking apparatus for a hydromechanical spring energy store drive of a high-voltage or medium-voltage switch, for example, a circuit breaker of a gas-insulated switchgear assembly, which can help avoid the damage to the drive as a result of faulty operation and can save time since the activation and deactivation of the latching bolt is no longer needed.

Furthermore, the disclosure relates to a hydraulic spring energy store drive for a medium-voltage or high-voltage circuit breaker, which includes the locking apparatus also referred to as a blocking apparatus as disclosed.

SUMMARY

In accordance with an exemplary embodiment, a locking apparatus for a hydromechanical spring energy store drive for actuating a medium-voltage or high-voltage circuit breaker is disclosed, the spring energy store drive including a working piston, which is guided in an axial cutout in a pressure housing or working cylinder, and a spring energy store arrangement, which interacts with a latching bolt, the locking apparatus comprising: a first pressure region and a second pressure region, which are under elevated pressure when the circuit breaker is closed, and a third pressure region which is unpressurized; the latching bolt to be arranged perpendicular to the working piston, via the latching apparatus which is arranged on a side of the latching bolt which is to point towards the working piston and via the spring energy store arrangement to be pushed away from the working piston; wherein in an event of a loss of pressure in the first and second pressure regions, a spring force of the spring energy store arrangement will act on the latching bolt, the latching bolt being configured to press the latching apparatus into a cutout in the working piston; and wherein in an the event that a holding force of the spring energy store arrangement is exceeded, the working piston is configured to shift the latching bolt by virtue of an element that is rotatably mounted and located on the latching bolt and configured to roll over a surface of the working piston.

In accordance with an exemplary embodiment, a hydromechanical spring energy store drive for a circuit breaker of a gas-insulated switchgear assembly is disclosed, the spring energy store drive comprising: a working piston, which is guided in an axial cutout in a pressure housing or working cylinder; a latching bolt; a spring energy store arrangement, which interacts with the latching bolt; and a locking apparatus, the locking apparatus having a first pressure region and a second pressure region, which are under elevated pressure when the circuit breaker is closed, and a third pressure region which is unpressurized; the latching bolt to be arranged perpendicular to the working piston, via a latching apparatus which is arranged on a side of the latching bolt which is to point towards the working piston and via the spring energy store arrangement which is to be pushed away from the working piston; wherein in an event of a loss of pressure in the first and second pressure regions, a spring force of the spring energy store arrangement will act on the latching bolt, and the latching bolt being configured to press the latching apparatus into a cutout in the working piston; and wherein in an the event that a holding force of the spring energy store arrangement is exceeded, the working piston is configured to shift the latching bolt by virtue of an element that is rotatably mounted and located on the latching bolt and configured to roll over a surface of the working piston.

BRIEF DESCRIPTION OF THE DRAWINGS

The disclosure is explained below with reference to the exemplary embodiments shown in the drawings. In the drawings.

DETAILED DESCRIPTION

Figure 1:
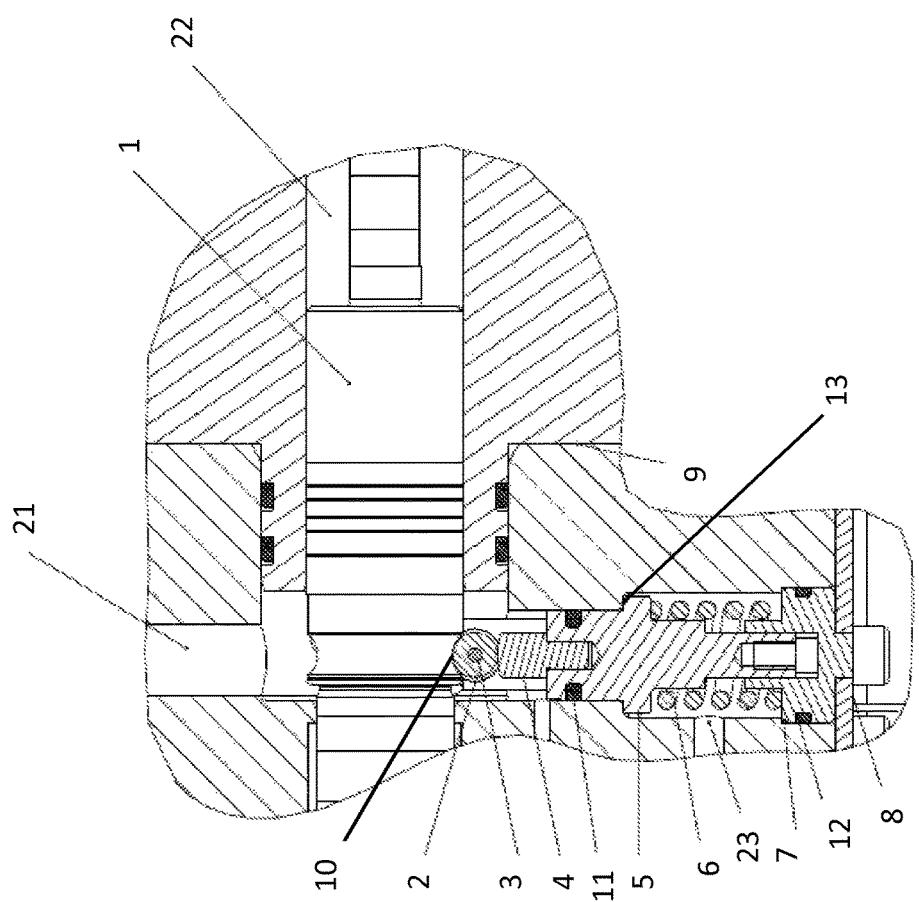
FIG. 1 shows a detail of a hydromechanical spring energy store drive with an exemplary embodiment of the locking apparatus for a circuit breaker of a gas-insulated high-voltage switchgear assembly in a schematic sectional view.

In accordance with an exemplary embodiment, a locking apparatus is disclosed for a hydromechanical spring energy store drive for actuating a medium-voltage or high-voltage circuit breaker, which can include a working piston which is guided in an axial cutout located in a pressure housing, also referred to as working cylinder, and a spring energy store arrangement acting as compression spring, with which a fluid can be pressurized when the circuit breaker is closed.

The locking apparatus according to the disclosure can include a first pressure region and a second pressure region, which can be under elevated pressure when the circuit breaker is closed, and a third pressure region which can be unpressurized when the circuit breaker is closed.

In accordance with the disclosure, a latching bolt arranged perpendicular to the working piston is provided, which has a latching apparatus on the side pointing towards the working piston. If the circuit breaker is in the closed state, the latching bolt and the spring energy store arrangement can be pushed away from the working piston, and the latching bolt is not in engagement with the working piston or does not block it.

For example, in the event of a pressure loss in the first and second pressure region of the working cylinder, in accordance with an exemplary embodiment, only the spring force of the spring energy store arrangement can act on the latching bolt and the latching apparatus interacting therewith. The spring force of the spring energy store arrangement in the process presses the latching apparatus arranged on the latching bolt into a cutout, which can be incorporated in the outer contour of the working piston and can be, for example, in the form of a groove.

In accordance with an exemplary embodiment, in the event that the holding force of the spring energy store arrangement is exceeded, for example, the axial force on the working piston which results from the compression spring of the spring energy store arrangement, the working piston can shift the latching bolt by an element which is mounted rotatably and is located on the latching bolt, for example by means of a cylindrical pin, rolling away over the surface of the working piston without damaging same.

In accordance with an exemplary embodiment, the rotatably mounted element in the form of a roller or drum which engages in the cutout located in the working piston in the event of a pressure loss can be guided by means of the cylinder pin in a slot in the latching bolt, and since the rotatably mounted element is held, a free rotation of the roller is possible and the rotatably mounted element can be prevented from falling out when the rotatably mounted element is not in contact with the working piston.

In accordance with an exemplary embodiment, the latching bolt can have, on its side pointing towards the working piston, a separate supporting bolt, which can interact with the rotatably mounted element. The supporting bolt can act as counter bearing for the rotatably mounted element, which can be in the form of a roller, for example, in order that the thin cylinder pin remains unloaded.

The supporting bolt and the roller or drum can be manufactured from a hardened metal. For example, by virtue of the separate embodiment of the supporting bolt, a relatively simple and relatively inexpensive production of the latching apparatus and the latching bolt can be manufactured.

FIG. 1 shows a detail of a hydromechanical spring energy store drive with an exemplary embodiment of the locking apparatus according to the disclosure for a circuit breaker of a gas-insulated high-voltage switchgear assembly, which includes a working cylinder 9, in which a working piston 1 can be guided in an axial cutout, and a spring energy store arrangement 6 acting as compression spring, which can be responsible for the movement of a latching bolt 5. A cover plate 8 can close off the working cylinder 9 in a pressure-tight manner.

A spring arrangement (not illustrated) of the spring energy store drive can pressurize a fluid when the circuit breaker is closed. The fluid which is pressurized by the spring arrangement of the spring energy store drive can pretension the compression spring 6.

The working cylinder 9 can include a first pressure region 21 and a second pressure region 22 to which a working or system pressure can be applied. When the working piston 1 is located in the position shown in FIG. 1, the first pressure region 21 and the second pressure region 22 can be connected to one another via the main valve.

The working piston 1 arranged in the movement region formed by the axial cutout of the working cylinder 9 can be movable depending on a pressure difference between the pressure regions 21, 22.

When the circuit breaker is closed, the first pressure region 21 and the second pressure region 22 are at elevated pressure. A third pressure region 23, which interacts with the spring energy store arrangement 6, can be permanently unpressurized.

A latching bolt 5 can be arranged perpendicular to the working piston 1 and, via a latching apparatus 2, 3, 4 arranged on that side of the latching bolt 5 which points towards the working piston 1 and via the spring energy store arrangement 6, is in the process pushed away from the working piston 1. For example, the latching apparatus 2, 3, 4 in this case is not in engagement with the working piston or does not block the working piston.

The latching apparatus 2, 3, 4 includes an element 2 in the form of a roller or drum, which element can be mounted rotatably on a cylindrical pin 3 and can interact with a supporting bolt 4, which can be fitted on that side of the latching bolt 5 which points towards the working piston 1.

The latching bolt 5 can be guided in a stopper 7, wherein this guidance, by means of a form-fitting connection, can prevent a rotation of the latching bolt 5 and the latching apparatus 2, 3, 4 and can help ensure that the drum 2 is correctly in engagement with the groove or cutout 10 in the working piston 1.

In the event of a pressure loss, for example caused by leakages or during maintenance work on the drive of the circuit breaker, in the first and second pressure regions 21, 22, only the spring force of the spring energy store arrangement 6 can act on the latching bolt 5, and the latching bolt 5 presses the latching apparatus 2, 3, 4 into the groove 10 located in the working piston 1, as a result of which an undesired movement of the working piston 1, which is loaded by an external force, can be prevented. In the process, the pressure of the insulating gas of the gas-insulted switchgear assembly, which pressure arises in the circuit breaker module, presses onto the piston or switching rod and therefore onto the working piston of the drive.

For example, if the external force exceeds the holding force of the compression spring of the spring energy store arrangement 6, the latching bolt 5 can be pushed by the working cylinder 1 to the side, wherein the rotatably mounted element 2, which is in the form of a roller or drum and is mounted rotatably on the cylindrical pin 3, rolls away over the surface of the working piston 1 without damaging the working piston.

In accordance with an exemplary embodiment, the working piston 1 cannot be damaged when the roller 2 which is mounted rotatably on the cylinder pin 3 is guided over the surface of the working piston 1.

For example, in the case of a rigid latching bolt, the previously described operation in which the rigid latching bolt is moved or transferred would result in the formation of chips as a result of friction between the latching bolt and the working piston and therefore in damage within the drive.

The above-described transferable latching bolt 5, on the other hand, can avoid damage to the drive owing to fault operation and saves on time which would otherwise be needed for activation and deactivation of the conventional latching bolt.

In accordance with an exemplary embodiment, the locking apparatus according to the disclosure, the roller or drum 2 and the groove 10 can be configured in the lateral surface of the working piston 1 in such a way that as large a contact area as possible is produced in the event of engagement of the roller or drum 2 in the groove 10. For example, for this, the drum or roller 2 can be configured with a curvature corresponding to the contact area on the working piston 1. As a result, instead of a tiny contact point, a contact line can be provided, which can enlarge the contact point. Owing to the larger contact point, the compressive load per unit area of the two component parts 1, 2, which are in contact can be reduced.

As a result, the surface pressure of the component parts 1, 2, which can be in contact can be reduced in the region of the cutout 10.

In the sectional illustration through the roller or drum 2 which is shown in FIG. 1, the circular shape of the groove 10 is illustrated, via which the roller or drum 2 rolls.

In accordance with an exemplary embodiment, a first seal 11 provided can separate the first pressure region 21 from the third pressure region 23 and a further seal 12 can separate the third pressure region 23 from the surrounding environment. For example, when the circuit breaker is closed, the first pressure region 21 can be under elevated pressure and the pressure region 23 can be unpressurized.

In accordance with an exemplary embodiment, guidance of the roller 2 by means of the cylinder pin 3 in a slot in the latching bolt 5 can keep the roller 2 in position, which can enable free rotation and can prevent the roller 2 from falling out as long as the roller 2 is not in contact with the working piston 1.

For example, in accordance with an exemplary embodiment, end stop faces 13 in the interior of the working cylinder 9 can prevent the latching bolt 5 from protruding too far into the working piston 1.

Figure 2:
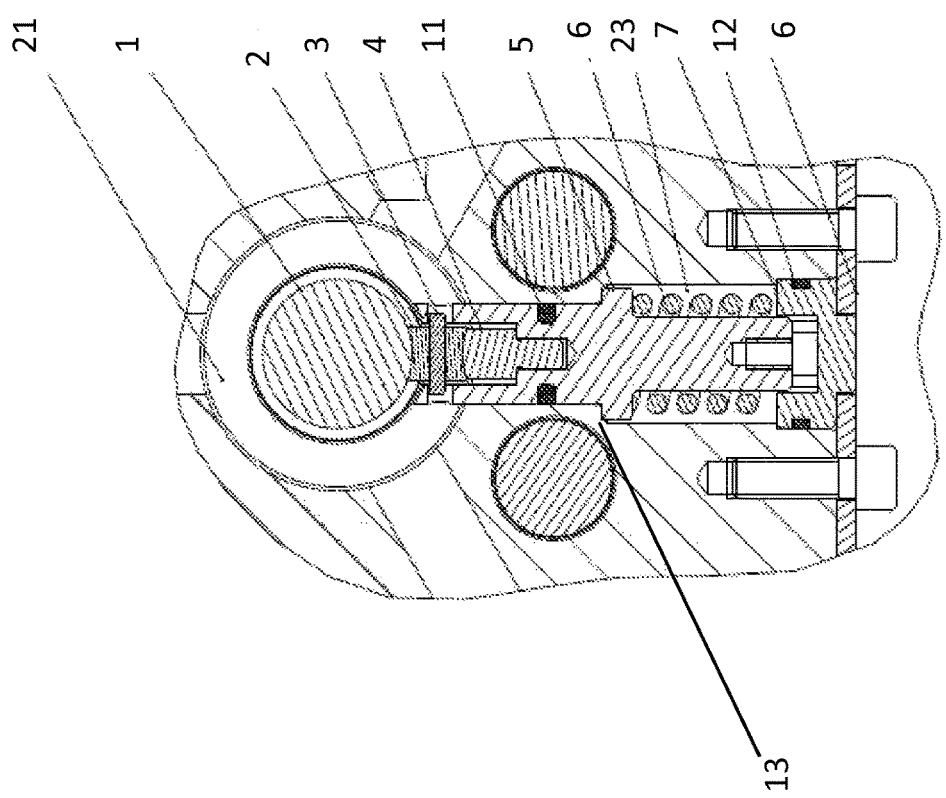
FIG. 2 shows a schematic sectional view of an exemplary embodiment, of the locking apparatus of the hydromechanical spring energy store drive for the high-voltage circuit breaker.

A further schematic sectional view of the locking apparatus according to the disclosure of the hydromechanical spring energy store drive for a high-voltage circuit breaker is shown in FIG. 2, wherein an enlarged contact area as a result of the curvature of the drum or roller 2 can be seen.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Working piston
2 Rotatably mounted element, roller, drum
3 Cylindrical pin, cylinder pin
4 Supporting bolt, bolt, pin
5 Latching bolt, blocking element
6 Compression spring, spring energy store arrangement
7 Stopper
8 Cover element, cover plate
9 Pressure-tight housing, working cylinder
10 Cutout, groove
11 First seal, high-pressure seal
12 Further seal, low-pressure seal
21 First pressure region
22 Second pressure region
23 Third pressure region

What is claimed is:

1. A locking apparatus for a hydromechanical drive for actuating a medium-voltage or high-voltage circuit breaker, the spring energy store drive including a working piston, which is guided in an axial cutout in a pressure housing or working cylinder, the locking apparatus comprising:
   a spring energy store arrangement, which interacts with a latching bolt;
   a first pressure region, which is under elevated pressure when the circuit breaker is closed, and a third pressure region which is unpressurized due to which the latching bolt which is to be arranged perpendicular to the working piston, will be pushed away from the working piston via the spring energy store arrangement and via a latching mechanism, which latching mechanism is arranged on a side of the latching bolt that is to point towards the working piston;
   wherein in an event of a loss of pressure in the first pressure region, a spring force of the spring energy store arrangement will act on the latching bolt, the latching bolt being configured to press the latching mechanism into a cutout in the working piston; and
   wherein in an event that a holding force of the spring energy store arrangement is exceeded, the working piston is configured to shift the latching bolt by virtue of an element of the latching mechanism that is rotatably mounted and located on the latching bolt and configured to roll over a surface of the working piston.

2. The locking apparatus according to claim 1, wherein the element that is rotatably mounted is a roller, which is rotatably mounted on a cylindrical pin, and configured to roll over the surface of the working piston.

3. The locking apparatus according to claim 2, wherein the roller is configured to be guided by the cylindrical pin in a slot in the latching bolt, and wherein a free rotation of the roller is enabled and the roller is prevented from falling out as long as the roller is not in contact with the working piston.

4. The locking apparatus according to claim 1, wherein the element that is rotatably mounted is a barrel, which is rotatably mounted on a cylindrical pin, and configured to roll over the surface of the working piston.

5. The locking apparatus according to claim 4, wherein the barrel is configured to be guided by the cylindrical pin in a slot in the latching bolt, and wherein a free rotation of the barrel is enabled and the barrel is prevented from falling out as long as the barrel is not in contact with the working piston.

6. The locking apparatus according to claim 5, comprising:
a supporting bolt on the latching bolt, which is configured to interact with the rotatably mounted element on a side of the latching bolt pointing towards the working piston.

7. The locking apparatus according to claim 6, wherein the supporting bolt and the barrel are formed from a hardened metal.

8. The locking apparatus according to claim 1, in combination with the circuit breaker having the spring energy store drive, wherein the spring energy store drive includes the working piston, which is configured to be guided in the axial cutout in the pressure housing or working cylinder.

9. The locking apparatus according to claim 8, wherein the cutout in the working piston is in an outer contour of the working piston.

10. The locking apparatus according to claim 9, wherein the cutout is a groove.

11. The locking apparatus according to claim 10, comprising:
a spring energy store arrangement, and wherein the spring energy store arrangement is a compression spring.

12. A hydromechanical drive for a circuit breaker of a gas-insulated switchgear assembly, the hydromechanical drive comprising:
a working piston, which is guided in an axial cutout in a pressure housing or working cylinder;
a latching bolt;
a spring energy store arrangement, which interacts with the latching bolt; and
a locking apparatus, the locking apparatus having a first pressure region, which is under elevated pressure when the circuit breaker is closed, and a third pressure region which is unpressurized due to which the latching bolt which is to be arranged perpendicular to the working piston, will be pushed away from the working piston via the spring energy store arrangement and via a latching mechanism which latching mechanism is arranged on a side of the latching bolt that is to point towards the working piston;
wherein in an event of a loss of pressure in the first pressure region, a spring force of the spring energy store arrangement will act on the latching bolt, and the latching bolt being configured to press the latching mechanism into a cutout in the working piston; and
wherein in an event that a holding force of the spring energy store arrangement is exceeded, the working piston is configured to shift the latching bolt by virtue of an element of the latching mechanism that is rotatably mounted and located on the latching bolt and configured to roll over a surface of the working piston.

13. The hydromechanical drive according to claim 12, wherein the element that is rotatably mounted is a roller or barrel, which is rotatably mounted on a cylindrical pin, and configured to roll over the surface of the working piston.

14. The hydromechanical drive according to claim 13, wherein the roller or barrel is configured to be guided by the cylinder pin in a slot in the latching bolt, and wherein a free rotation of the roller or barrel is enabled and the roller or barrel is prevented from falling out as long as the roller is not in contact with the working piston.

15. The hydromechanical drive according to claim 12, wherein the cutout in the working piston is a groove in an outer contour of the working piston.

16. The hydromechanical drive according to claim 13, comprising:
a supporting bolt on the latching bolt, which is configured to interact with the rotatably mounted element on a side of the latching bolt pointing towards the working piston.

17. The hydromechanical drive according to claim 16, wherein the supporting bolt and the roller or barrel are formed from a hardened metal.

18. The hydromechanical drive according to claim 12, wherein the spring energy store arrangement is a compression spring.

19. The hydromechanical drive according to claim 12, in combination with a medium-voltage or a high-voltage circuit breaker.

20. The hydromechanical drive according to claim 19, wherein the medium medium-voltage or the high-voltage circuit breaker is a circuit breaker of a gas-insulated high-voltage switchgear assembly.

* * * * *